(12) United States Patent
Ho et al.

(10) Patent No.: US 7,355,976 B2
(45) Date of Patent: Apr. 8, 2008

(54) METHOD AND APPARATUS FOR PROVIDING RETRY CONTROL, BUFFER SIZING AND MANAGEMENT

(75) Inventors: Jin-Meng Ho, Plano, TX (US); Joseph Michael Erickson, Frisco, TX (US); Horng-Ming Lobo Tai, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 734 days.

(21) Appl. No.: 10/890,679

(22) Filed: Jul. 14, 2004

(65) Prior Publication Data

US 2005/0175024 A1 Aug. 11, 2005

Related U.S. Application Data

(60) Provisional application No. 60/543,338, filed on Feb. 9, 2004.

(51) Int. Cl.
*H04J 1/16* (2006.01)
(52) U.S. Cl. ..................................... 370/235
(58) Field of Classification Search ................ 370/395, 370/356, 400, 397, 85, 278, 412, 429, 229, 370/389, 428; 709/220, 230; 725/116; 455/455
See application file for complete search history.

(56) References Cited

U.S. PATENT DOCUMENTS

| 4,912,703 | A * | 3/1990 | Sumida | 370/235 |
|---|---|---|---|---|
| 6,795,443 | B1 * | 9/2004 | Jeong et al. | 370/395.5 |
| 6,986,158 | B1 * | 1/2006 | Terui et al. | 725/116 |
| 2002/0073184 | A1 * | 6/2002 | Maeda et al. | 709/220 |
| 2002/0099838 | A1 * | 7/2002 | Sebastian | 709/230 |
| 2003/0214955 | A1 * | 11/2003 | Kim | 370/400 |
| 2004/0105444 | A1 * | 6/2004 | Korotin et al. | 370/395.5 |
| 2004/0132452 | A1 * | 7/2004 | Lee | 455/445 |
| 2004/0136331 | A1 * | 7/2004 | Varma | 370/278 |
| 2004/0165595 | A1 * | 8/2004 | Holmgren et al. | 370/395.3 |

\* cited by examiner

*Primary Examiner*—Kwang Bin Yao
*Assistant Examiner*—Syed Bokhari
(74) *Attorney, Agent, or Firm*—Steven A. Shaw; W. James Brady; Frederick J. Telecky, Jr.

(57) ABSTRACT

A retry algorithm determines the maximum number of transmissions and retransmissions that may be attempted for the frame in the head of a transmit queue or transmit buffer that needs to be transmitted across a communications link. The algorithm attempts to achieve a constant delay for each packet in frame by taking into account the number of frames residing in the transmit queue, the number of transmit opportunities elapsed between the arrivals of two successive frames in the transmit queue s, as well as the buffering capabilities of both the transmitting and receiving sides. The transmission and retransmission control technique provides for a way of managing the TX and RX buffers with a size that is suitable for the application being used and the underlying transport network. The number of retries is adapted to incoming and outgoing data rate changes in order to provide a fixed delay wireless link transport and maximize effective channel utilization.

22 Claims, 11 Drawing Sheets

METHOD AND APPARATUS FOR PROVIDING RETRY CONTROL, BUFFER SIZING AND MANAGEMENT

CROSS REFERENCE TO RELATED APPLICATIONS

This application claims the benefit of U.S. provisional Application No. 60/543,338, filed on Feb. 9, 2004, by Ho, et al.

FIELD OF THE INVENTION

These inventions relates in general to the field of communications and networking and more particularly to a method and apparatus for providing retry control, buffer sizing and buffer management techniques necessary for data transmission.

BACKGROUND

Determining and managing the size of transmit (TX) and receive (RX) buffers and controlling retries of data frames are some of the more important issues faced when designing a transport mechanism for use with either wireline or wireless electronic devices over impaired channels. Some buffer sizing and management techniques currently in use were designed for wireline transport applications and are not suitable to a wireless transport setting, given the higher error rates and bursty transmission techniques/applications that are associated with wireless environments. Other buffer sizing and management techniques, such as those used for the Real-time Transport Protocol (RTP), have heavy buffer requirements typically in the order of 100's of Kilobytes of memory to support a typical video streaming application. The need for so much buffer memory adds to the overall cost of a design and the latency of the transport, and may not be appropriate for some cost sensitive designs or designs where space is at a premium.

With regard to retry control mechanisms, in some systems, retries are usually performed with a fixed maximum number of transmission attempts, regardless of the buffer capacity available or the requirements of the application (e.g., MPEG 2 transport streams) being used. This leads to situations where system overhead and transport latency are unnecessarily increased and where retries are attempted even when the information that is being retransmitted may be too "old" to be useful while channel utilization is approaching channel capacity, or information may be lost because a buffer (e.g., transmit buffer) may not be large enough to hold the amount of incoming data that needs to be transmitted while the retries are being attempted.

SUMMARY OF INVENTION

In accordance with a first aspect of the invention, a method for determining the retransmission attempts that will be made for an information frame that needs to be transmitted includes assembling a frame at a transmit buffer and determining the value of N from the equation N=min (N+B, I+1−Q) or N=N−1 for a retransmission attempt to determine a maximum number of transmission and retransmission attempts that may be made to transmit or retransmit the frame, the equation recalculates a new value of N, based on the previous value N.

In a second aspect of the invention a communication device includes a transmit buffer and a means for recalculating the value of N based on the equation N=min (N+B, I+1−Q) or N=N−1, wherein the equation recalculates a new value of N, based on the previous value N. N, after the recalculation, specifies a maximum number of transmission and retransmission attempts that may be made for a frame in the head of a transmit queue.

In a third aspect of the invention the communication devices include a Moving Pictures Experts Group 2 (MPEG2) codec for encoding/decoding the information that is transmitted or received.

In still another aspect of the invention, a method for maintaining a substantially constant delay for each packet in a frame that is transmitted between a first and a second communication device includes recalculating a maximum number of transmission and retransmission attempts that can be made for every frame that is to be transmitted or retransmitted from the first to the second communication device and using the equation N=min (N+B, I+1−Q) or N=N−1 to determine the maximum number of transmission and retransmission attempts, wherein the equation recalculates a value of N, based on the previous value N.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The features of the present invention, which are believed to be novel, are set forth with particularity in the appended claims. The invention may best be understood by reference to the following description, taken in conjunction with the accompanying drawings, in the several figures of which like reference numerals identify like elements, and in which:

DETAILED DESCRIPTION

While the specification concludes with claims defining the features of the invention that are regarded as novel, it is believed that the invention will be better understood from a consideration of the following description in conjunction with the drawing figures.

In order to compensate for the "bursty" nature of the data arrivals from an application such as a Moving Picture Experts Group 2 (MPEG-2) Transport Stream (MPEG2-TS) and of the data transmissions of the application over a wireless link, a retry algorithm is devised and implemented in accordance with an embodiment of the invention which controls the retries of data frames by adapting to that bursty nature and attempts to meet the target data loss and delay requirements of the application.

Figure 1:
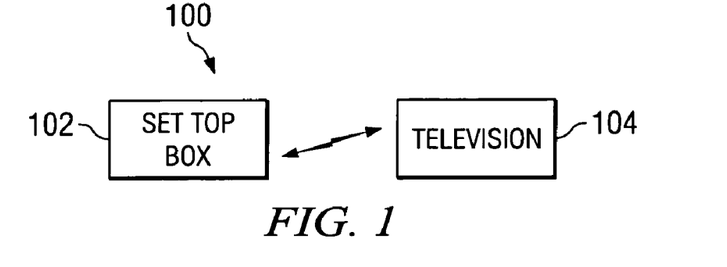
FIG. 1 shows a block diagram of a communication system in accordance with an embodiment of the invention

In FIG. 1, there is shown a wireless communication system 100 that includes a set top box 102 and a television 104 that are communicating via a wireless link with each other. Set top box 102 can receive signals via a television cable network, television broadcast network, or a television satellite network. As an example, the set top box 102 may be transmitting a movie or other video information to the television set 104 using the MPEG-2 application and incorporates the retry algorithm of the present invention. In order for the set top box 102 to transmit information to the television set 104, it may use, as illustrative example, an Ultra-Wide Band (UWB) transceiver or other wireless or wire line device. It should be noted that although this embodiment of the invention is being described in relation to a set top box 102 and television set 104, the present invention is not so limited and can be implemented in any device that needs to communicate with another device either via a wireless link as in this illustrative embodiment, or using a wireline connection.

Figure 2:
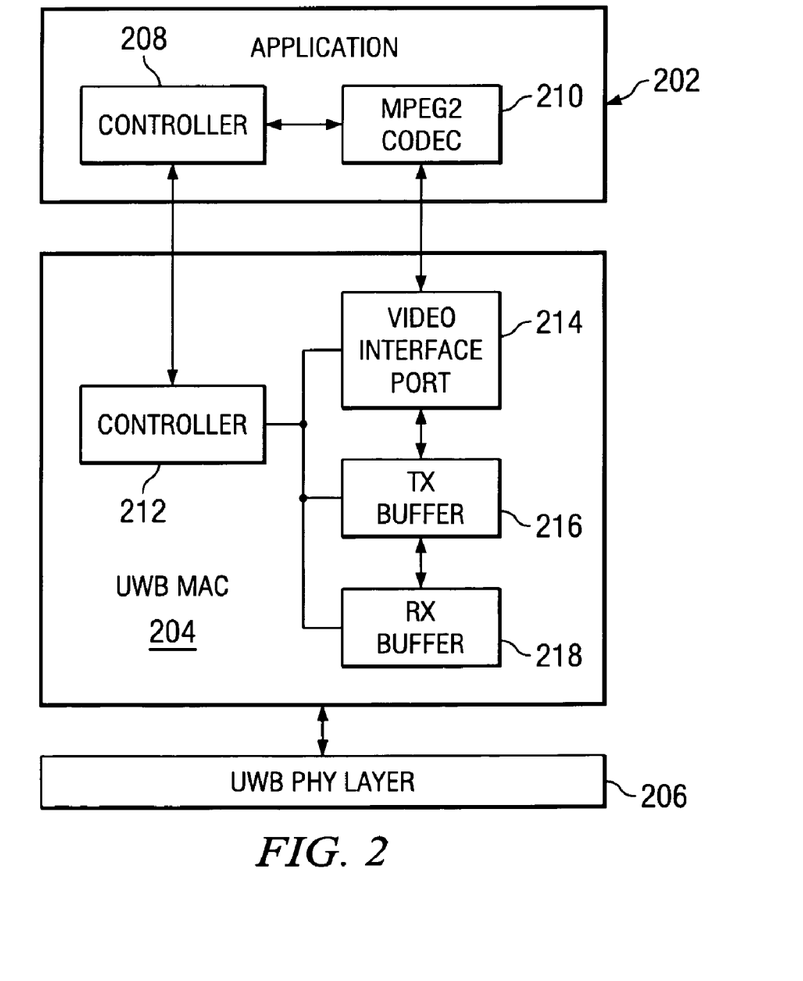
FIG. 2 shows a block diagram of an electronic device in accordance with an embodiment of the invention.

In FIG. 2, there is shown a simplified block diagram of the set top box 102 highlighting the elements of this embodiment of the invention. The set top box 102 includes an UWB physical (PHY) layer 206 which may include such components as the radio frequency circuitry, input/output connections and other PHY layer circuitry (not shown). Coupled to the UWB PHY layer 206 is the UWB Medium Access Control (MAC) layer 204. The MAC layer 204 includes a video interface port 214, a Tx (transmit) buffer 216, a Rx (receive) buffer 218 and a controller 212. The Tx 216 and Rx 218 buffers may comprise memory storage areas such as Random Access Memory (RAM) or other types of memory, depending on the specific design requirements (e.g., some designs may use a first-in first-out (FIFO) architecture.) The functions of controller blocks 208 and 212 can be performed by a microprocessor, microcontroller or other combination of hardware and/or software that can execute the necessary algorithms to provide control for the set top box 102 as well as comprise the means for calculating the values of N from Equation 1 or 2 as described below.

Coupled to the UWB MAC layer 204 is the application layer 202. The application layer 202 in this embodiment includes a MPEG-2 Codec 210, which performs all the necessary MPEG-2 data manipulation. The application layer may also include further controller 208 functions such as for controlling the operation of the MPEG-2 Codec 210.

It is worth noting that although the retry algorithm is being described here in relation to an MPEG-2 application, it can be used with other applications that require a retry mechanism in either wireless or wireline designs. One purpose of the retry algorithm is to determine a retry count for every frame that needs to be transmitted, based on the application being used which in this example is MPEG-2-TS and the transmission medium being used, which in this example is an Ultra Wideband (UWB) wireless link.

The retry algorithm in accordance with an embodiment of the invention is based on the following equations which recalculates a value, N, prior to each new transmission attempt and after each transmission attempt. The equations use a min (minimum) function which selects the smaller of the two values (N+B) or (I+1−Q). The algorithm is based on the following equations:

$N=\min(N+B, I+1-Q)$ for each new transmission attempt     Equation 1

$N=N-1$ after each transmission attempt     Equation 2

Wherein,

The new value of N is the maximum number of transmission attempts that may be made for the head-of-queue frame (frame that is in line for transmission at the transmit (Tx) buffer.) Equations 1 and 2 recalculate a new value of N, based on the previous value N. Prior to each frame transmission attempt, the value of N is calculated using Equation 1 maintained by the Tx path and the equation recalculates a new value of N, based on the previous value N. After each transmission attempt (whether successful or not), the value of N is decremented by 1 as indicated by Equation 2. The decrementing can be done by the transmitter. If N>0 after Equation 1 is executed, the Tx path will attempt to transmit the (new) frame; if N>0 after Equation 2 is executed, the Tx path will attempt to retransmit the (old) frame which failed in the previous transmission or retransmission Otherwise, the frame will be discarded. For each new or old frame that is to be transmitted or retransmitted, the Tx Path will recalculate a new value N using Equation 1 or 2, respectively. Because it is possible that several "aged" frames (frames that have already exceeded their link delay limit, before being transmitted) may reside in the queue, the Tx path will verify N>0 before each transmission or retransmission attempt, including the first one, of every frame.

I is a constant value that is stored as a Tx path parameter in the device's memory. This value can be set before enabling a transmission such as a video stream transmission. I, is typically determined based on the buffering capabilities of both the transmitting node and the receiving node, if known. It is also based on the available bandwidth that was allocated for the transmission of the video stream. For example, if there is plenty of bandwidth allocated, then more retry attempts can be made in case the transmission is occurring in an error prone environment. The value for I can be set and stored when a device incorporating the invention is manufactured, with the value for I being preferably stored in non-volatile memory so that it is retained even if the device is powered down. I is the maximum number of transmit opportunities for a data frame. Examples on how I is determined will be provided further below.

Q is the number of frames residing in the transmit queue for this stream. For each new frame that is received, such as at the video interface port 214, this value will be incremented by 1. For each successful frame transmit or discard of this stream, this value of Q is decremented by 1.

B is the number of transmit opportunities between successive data frames received in the transmit buffer. This number may be provided by the firmware for each frame in its Buffer Descriptor (BD.) The firmware may keep a local B counter that gets incremented for each successful or failed transmission attempt (these events may result in interrupts from the Tx path). When a new frame arrives at the video interface port 214, the current value of B may be stored in the frame's BD and B will be reset to 0. When the transmit queue is empty (Q=0), both B and N are set to I. This may include the time when a stream is newly created. Since B does not need to be maintained when the queue is empty, it does not need to be notified (interrupted) for each transmission opportunity that arises when no data is available for transmission. Setting B and N to I when Q=0 ensures that N=I (after Equation 1 is executed) for the first frame arriving in the queue (Q=1). This simplifies the Tx path so it does not have to recognize the empty queue condition and can use the same equation for every frame, regardless of the queue status.

The algorithm of Equations 1 and 2 is derived based on the following considerations: N should not be larger than I+1−Q in order that all the remaining Q−1 frames, especially the one at the end of the queue, be transmitted within (I+1−Q)+(Q−1)=I transmit opportunities since their arrival to meet the link delay limit. Moreover, after each transmit attempt, as for example after a transmit opportunity has elapsed, the number of transmissions allowed for the head-of-the queue frame is reduced by one. The more/less transmissions the current head-of-the-queue frame is attempted, the less/more transmissions the next frame in the transmit queue can have to meet the link delay limit of a particular design. That is, N must be decremented by one upon each transmission attempt and is carried over to the next frame in the queue. If a frame arrives B transmit opportunities after the previous frame, that frame can be given B more transmit opportunities for the same link delay limit, hence N+B in the above Equation 1.

Some of the considerations used in implementing the retry algorithm include that the PHY layer 206 characteristics provide the MAC layer 204 with raw (after PHY layer Forward Error Correction (FEC) but before MAC retry) Frame Error Rate (FER.) The application requirements (such as one frame loss per hour) dictate the target Frame Loss Rate (FLR) that is the rate in which frames are discarded after a certain number of retries. Also, retries in terms of numbers are determined to bring the raw FER provided by the PHY to the target FLR required by the application.

Other considerations include that Channel Time Allocations (CTAs) or transmission opportunities are arranged based on the PHY data rates, application data rates and retries. The link delay limit is calculated such that a frame can have the planned retries on the arranged CTA within this delay limit. The TX buffer is sized to provide enough buffering for newly arrived frames while earlier frames are undergoing retires. The RX buffer is sized to provide enough buffering for newly received frames, while earlier frames are waiting for their time to be released. The retries are controlled so that "old" frames that have been buffered at the TX side longer than the link delay limit are not transmitted or retransmitted. This ensures that precious medium bandwidth is not wasted on transmitting or retransmitting "old" frames and enforces a maximum acceptable delay necessary for applications such as streaming video.

Figure 3:
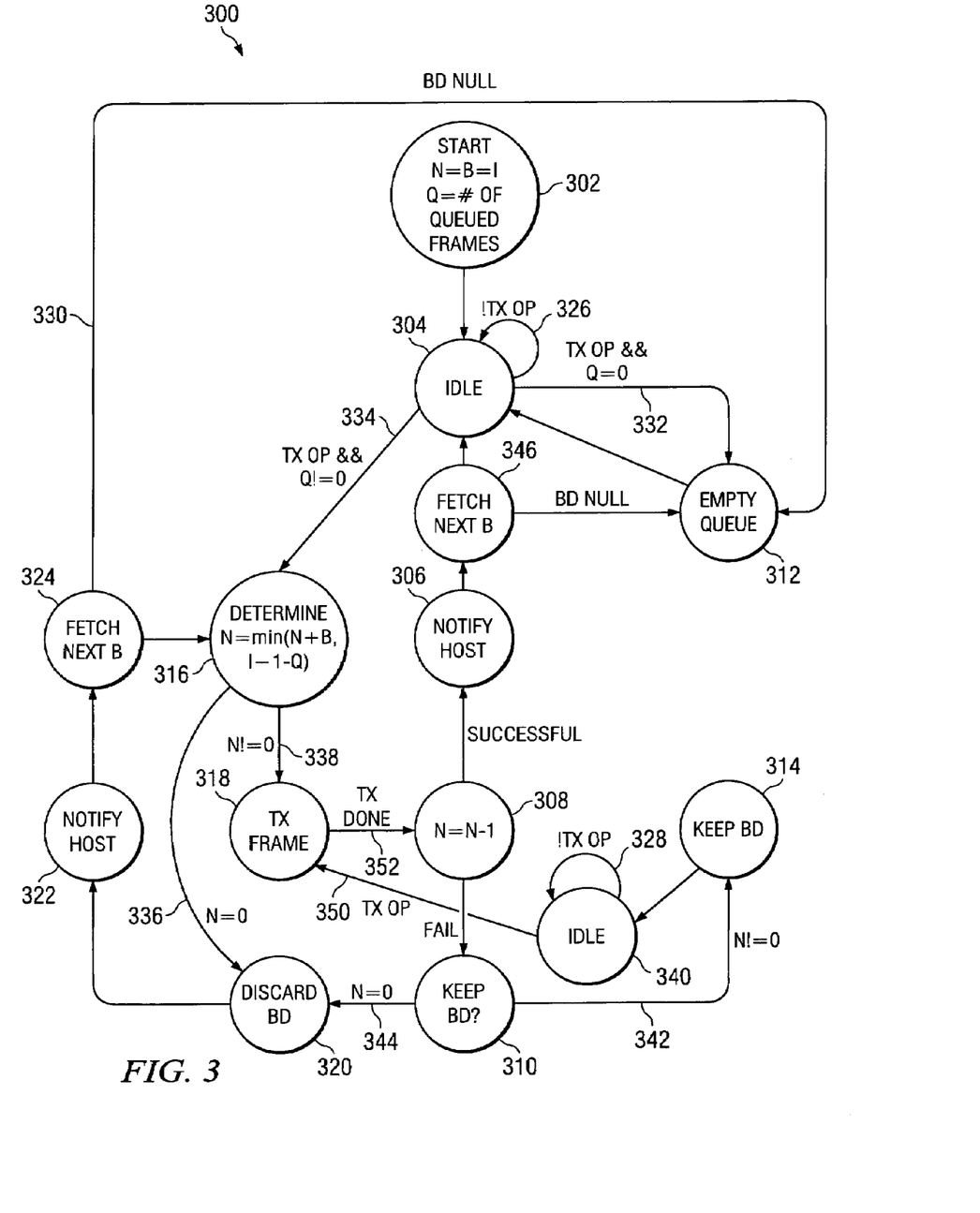
FIG. 3 shows a state diagram of a frame transmission routine in accordance with an embodiment of the invention.

Referring now to FIG. 3, there is shown a state diagram for the retry and buffer management algorithm of an embodiment of the invention. In state 302, the routine starts with variables B and N set equal to I and Q set equal to the number of data frames in the transmit queue. The routine then moves to idle state 304. If there is no transmit operation (!TxOp) as shown by event line 326, the routine stays in the idle state 304. If there is a transmit operation and Q is not equal to zero (TXop && Q !=0) as shown by event 334, the routine moves to "determine N state" 316 where N is recalculated by taking the min function of (N+B, I+1−Q). If, however, there is a transmit operation but Q is equal to zero (TxOp && Q=0) as shown by event 332, the routine moves to empty queue state 312 where the queue is emptied and then back to idle state 304.

If in the "determine N state" 316, if N is equal to zero as shown by event 336, the routine moves to the discard Buffer Descriptor (BD) state 320. If N is not equal to zero (N!=0), in state 316 the routine in event 338 moves to the transmit frame state 318. Once the transmission has occurred (Tx Done) in event 352, the routine moves to state 308 where N is reduced by 1. If the transmission was successful, the routine goes to state 306 from state 308 where it notifies the host. From state 306 the routine moves to state 346 where the next B is fetched. If the BD is a null in event 348 the routine goes to the empty queue state 312 where the queue is emptied, otherwise it moves to the idle state 304.

If the transmission failed, the routine moves to state 310 where it is determined whether to keep the BD for the most recent data frame. In state 310 if N is not equal to zero (N!=0), the BD is kept in state 314 and then the routine goes to idle state 340. From the idle state 340 the routine moves to state 318 upon a transmit operation (TX OP) occurring in event 350. If no transmit operation (!TX OP) occur 328, the routine stays in the idle state 340. If N is equal to zero as shown by event 344, from state 310 the routine moves to state 320 where the BD is discarded.

From state 320, the routine goes to state 322, where the host is notified and the routine moves to state 324 in order to fetch the next B. After fetching the next B, the routine moves to state 316 to determine the value of N for the new frame. If fetching the next B fails, i.e., if it is determined that the BD is a null as shown in event 330, the routine goes to the empty queue state 312, then to the idle state 304.

Figure 4:
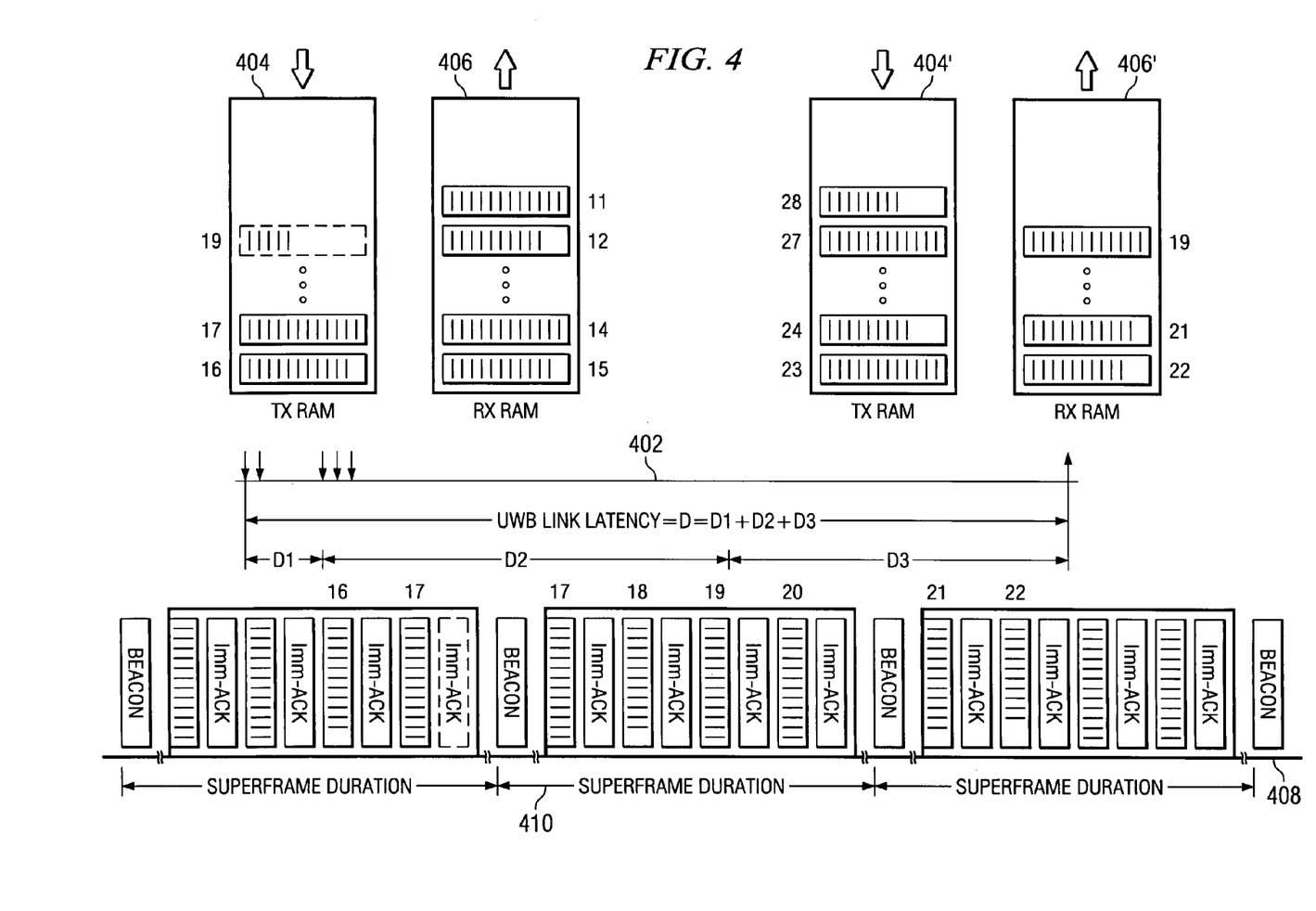
FIG. 4 shows a diagram highlighting the link delay components associated with an Ultra-Wide Band (UWB) system in accordance with an embodiment of the invention.

In FIG. 4, there is shown how the link latency (D) 402 for a wireless link in a wireless network such as a UWB system, using an MPEG2 application, is calculated in accordance with another embodiment of the invention. As shown, each data frame (e.g., 16) may include up to 12 MPEG2 packets. Each superframe in time line, for example, superframe 410, includes 4 transmit opportunities (17-20) each good for transmitting a data frame and an immediate acknowledgment. In the example of FIG. 4, the CTA shown in time line 408 comports to the Institute of Electrical and Electronic Engineers (IEEE) 802.15.3 standard or other appropriate medium access control (MAC) specifications. The link latency 402 is shown as the sum of intervals D1, D2 and D3. Interval D1 is the maximum time between the arrival of the first MPEG2 packet of the latest data frame in the TX RAM 304 and the start of the next transmission opportunity for this MPEG2 stream. D2 is equal to the time between the start of the earliest transmission opportunity for the MPEG2 stream, after the arrival of the first MPEG2 cell of the latest frame, and the end of the successful transmission of the frame. While D3 is the time between the end of the successful transmission of the frame and its release out of the RX RAM 406'.

Time line 408 shows the transmission of the different data frames and the Immediate Acknowledgments (Imm-ACK) that are sent out as soon as a particular frame (e.g., 17) is received. FIG. 4 also shows the TX RAM 404 and RX RAM 406 at different points in time, which are labeled 404' and 406' respectively.

Figure 5:
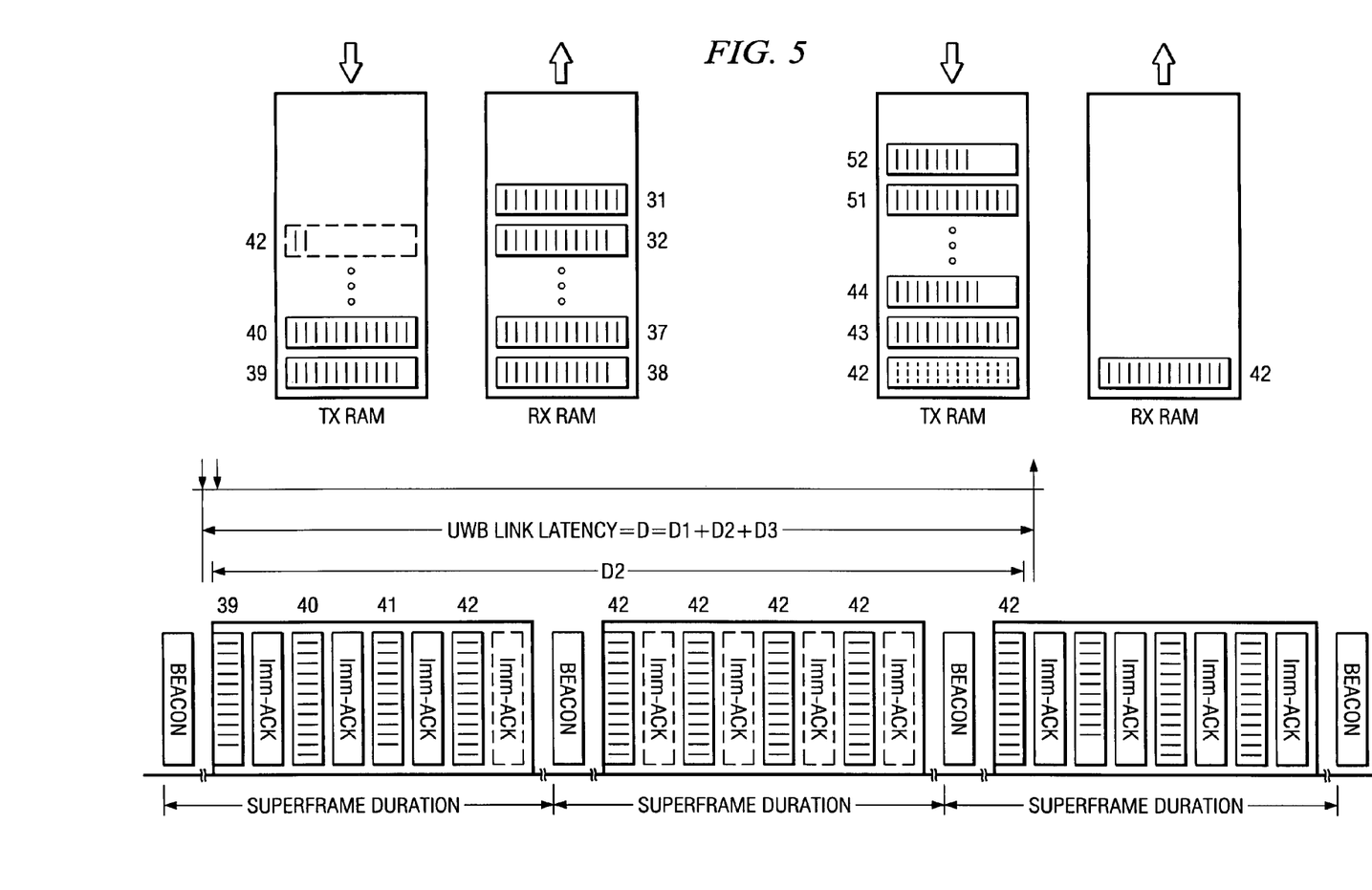
FIG. 5 shows a diagram highlighting the link latency budget associated with an UWB system in accordance with an embodiment of the invention.

In FIG. 5, there is shown how the UWB link latency D is equal to or greater than (≧) the maximum time interval spanning one frame transmission and its target retries plus the number of frame transmissions the failed frame must wait before its turn for transmission since its arrival in the TX RAM. In the example shown in FIG. 5, I is equal to 9, since there are only 9 transmission opportunities (i.e., 9 data frames may be transmitted) during the UWB link latency time.

Figure 6:
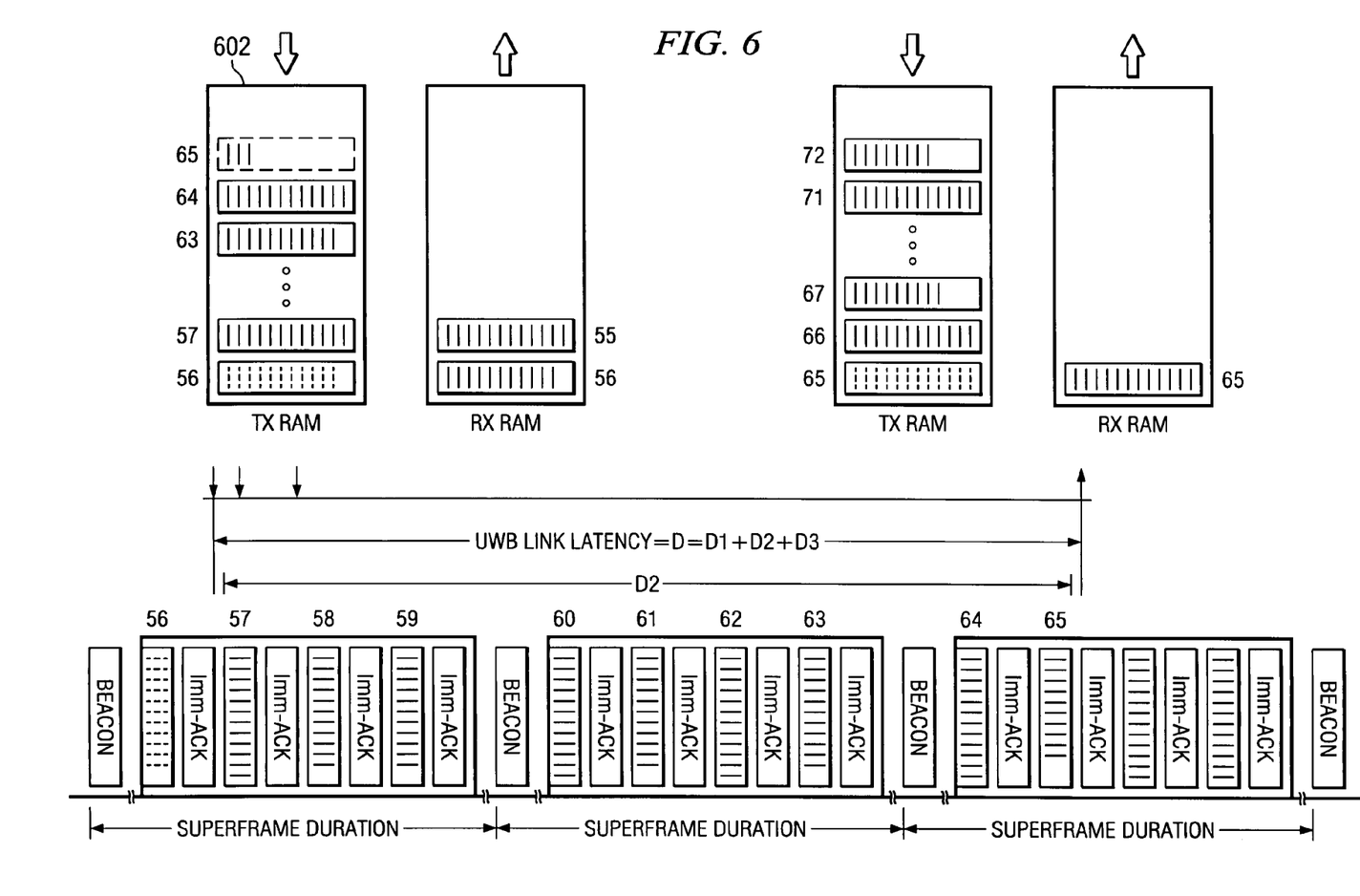
FIG. 6 shows a diagram highlighting how the TX RAM size is calculated in accordance with an embodiment of the invention.

In FIG. 6, there is shown how the TX RAM size is determined in accordance with an embodiment of the invention. Ideally, the TX RAM 602 should have TX RAM size be equal to or greater than (≧) 1 data frame+maximum number of data frames that may be transmitted during the UWB link latency time interval (D). In this example, that would be (1+9) data frames (frames 56-65) which could transmitted during the UWB link latency time interval (D), so the TX RAM 602 should be large enough in order to accommodate 10 or more data frames in order to avoid overflow conditions. Another consideration to look at when determining the TX RAM size is to have the TX RAM size be equal to or greater (≧) than the maximum number of data frames that may arrive in the TX RAM 602 during the UWB link latency time period (D.) This approach looks at the applications characteristics, in this particular illustrative example, the speed at which the MPEG2 application loads the TX RAM. The TX RAM should have at least the larger size obtained from the two approaches in order to be applicable to either scenario.

Figure 7:
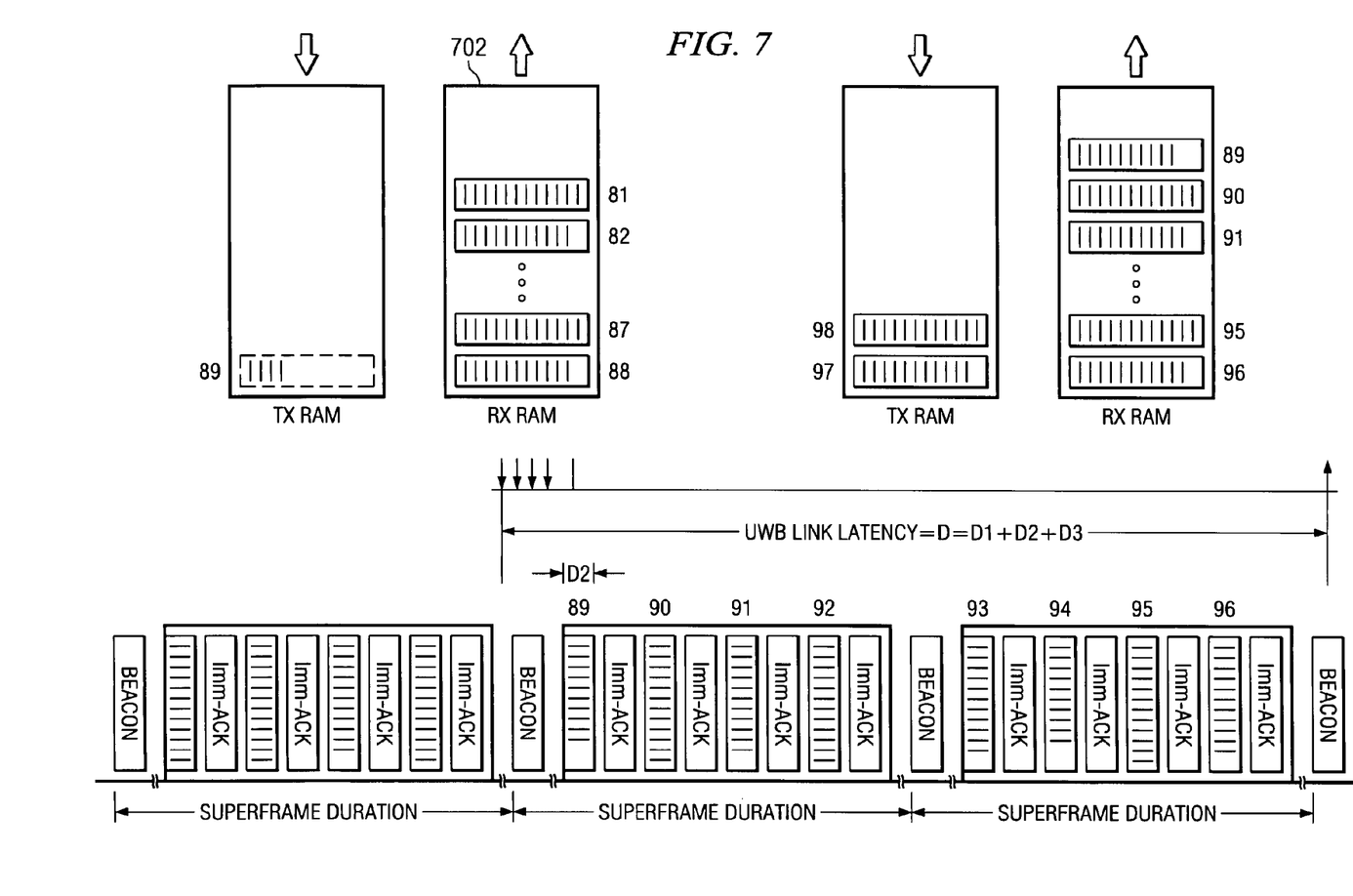
FIG. 7 shows a diagram highlighting how the RX RAM size is calculated in accordance with an embodiment of the invention.

FIG. 7 shows an illustration on how to calculate the RX RAM size in accordance with an embodiment of the invention. In this embodiment, the RX RAM size should be ≧maximum number of data frames that may be transmitted during a time interval of D, so that the RX RAM will not have an overflow while a data frame is still held in it waiting for its release time. The RX RAM size can also be determined by RX RAM size ≧maximum number of data frames that may arrive in the TX RAM during a time interval D. Again, the RX RAM should have at least the larger size inferred from both considerations.

Figure 8:
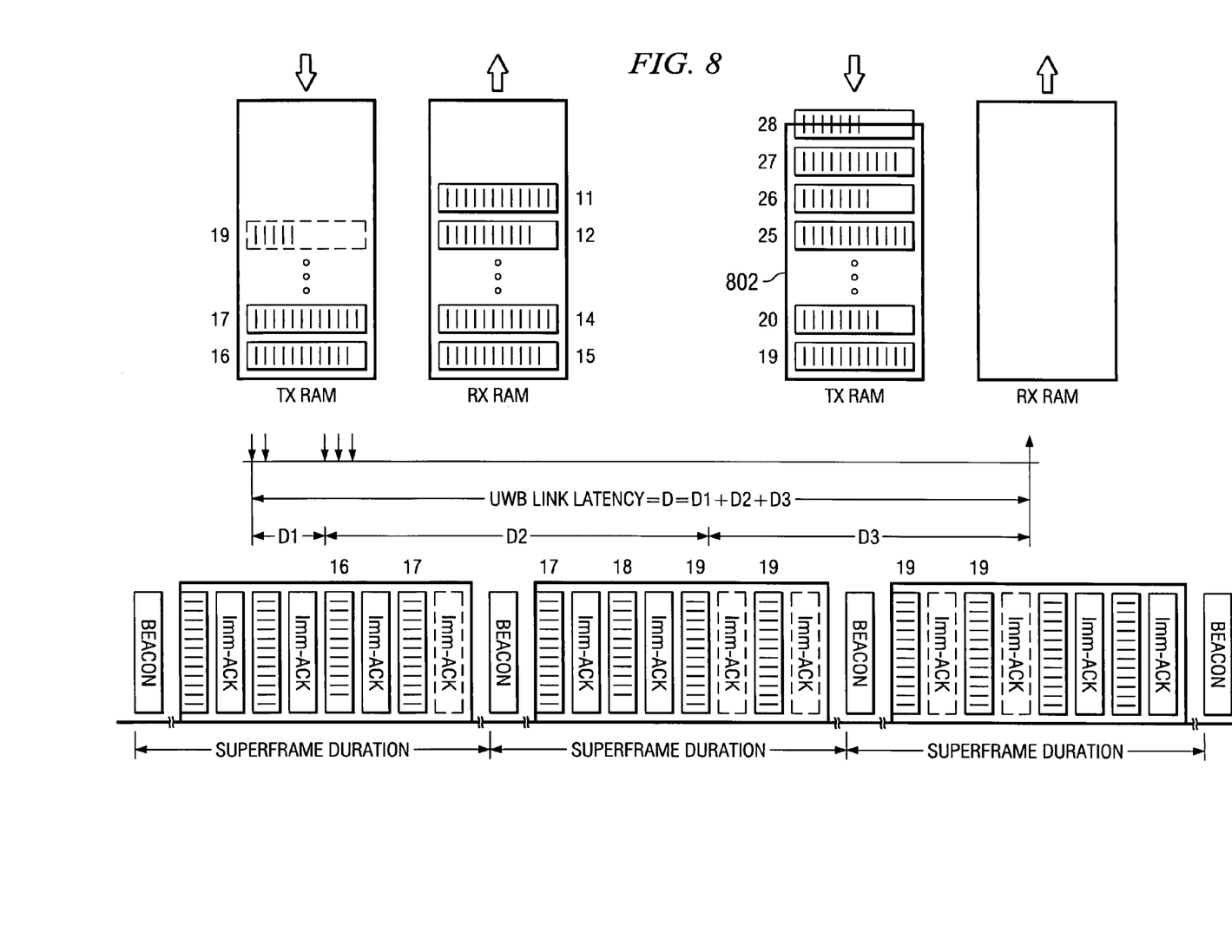
FIG. 8 shows a diagram highlighting some retry consideration in an UWB system in accordance with an embodiment of the invention.

In FIG. 8, there is shown some illustrations of retries of frames 17 and 19 which may be due to noise, interference or other factors. Some considerations for the amount of retries that should be allowed include the fact that retries, even when within the target retry limit, may result in transmission of aged MPEG2 packets and cause an overflow of the TX RAM as shown by TX RAM 802. The TX RAM overflow was caused by excessive retries within time period D occurred as shown. Another consideration for retries is that retries, without appropriate control, may lead to the transfer of MPEG2 packets after, but not before, their buffering time at the TX RAM exceeded the link latency period, when the CTA net throughput pertaining to the stream is close to the stream arrival data rate.

In an MPEG2 streaming video example, where 1 MPEG2 packet or cell is 188 bytes+a 4 byte timestamp for a total of 192 bytes, 1 data frame=12 MPEG2 cells; 1 Channel Time Allocation (CTA)=4 data frames; 1 Superframe=3 CTAs; 1 video stream=1 CTA (per Superframe); and the Superframe duration (SF)=2,680 µs; CTA duration=940 µs; MCTA duration=70 µs; using a Guard Time (GT)=2 µs; and using an MPEG2 application where 1 cell=188B from MPEG2 TS+4B for UWB timestamp; the MPEG2 cell data rate=19.404 MB/s=45, 478,125 cells/hour=3,789,844 frames/hour; and the Physical Layer (PHY) rate=110 Mb/s:

Using a wireless transmission range of 7.3 meter (m) the following was achieved,
FER (frame payload=1,024 bytes)=1%;
FER (frame payload=12 MPEG2 cells+8B IC+4B FCS)= 2.26%;
FLR (retry limit per frame=3)=2.62E-7, i.e., 1 frame/hour; and
Net throughput per CTA=26.9 Mb/S, accounting for retires; and using a wireless transmission range of 9.0 m the following was achieved,
FER (frame payload=1,024 bytes)=10%;
FER (frame payload=12 MPEG2 cells+8B IC+4B FCS)= 22.62%;
FLR (retry limit per frame=9)=3.50E-7 1.33 frames/hour; and
Net throughput per CTA=21.3 Mb/s—accounting for retries.

Figure 9:
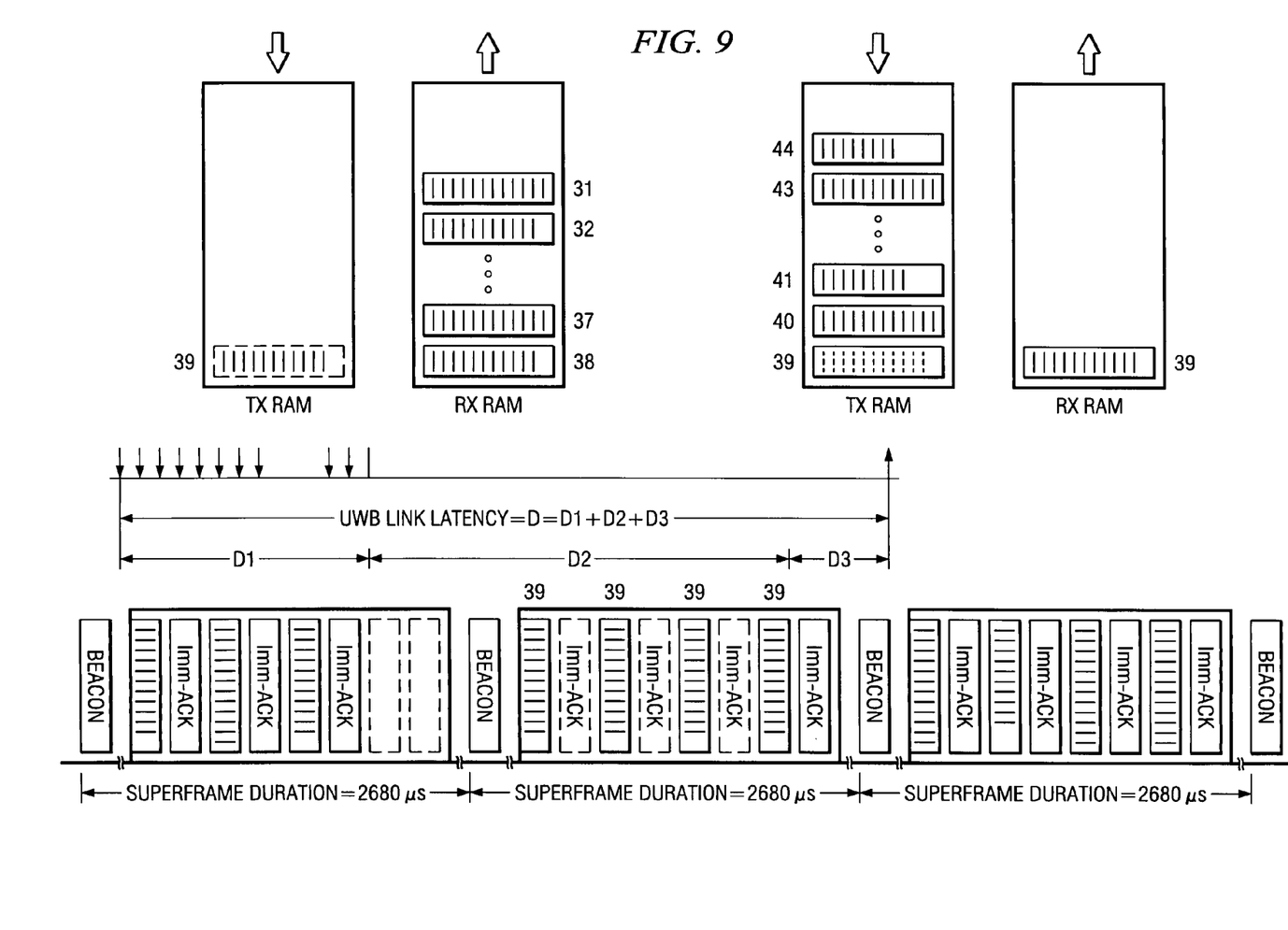
FIG. 9 shows a diagram highlighting an example of the link latency for a range of 7.3 meter in accordance with an embodiment of the invention.

In FIG. 9, there is shown the link latency for the UWB system having a range of 7.3 meters (m). In this example, D1 is equal to the framing delay, which is equal to 1000 microseconds (µs). Up to F=12 MPEG2 cells across a time interval up to D=1,000 µs are assembled into a data frame in the TX RAM. Frame assembling stops whenever either limit, F=12 MPEG2 cells or D1=1,000 µs is reached. D2 in this example is equal to 2,680 µs+182 µs or 2,862 µs which is the maximum time interval spanning one transmission and 3 retries. D3 is equal to 40 µs which is the minimum time between the end of a received data frame and the release of the earlier MPEG2 cell in that data frame. The UWB link latency in this example is therefore equal to 1,000 µs+2,862 µs+40 µs=3,902 µs.

Figure 10:
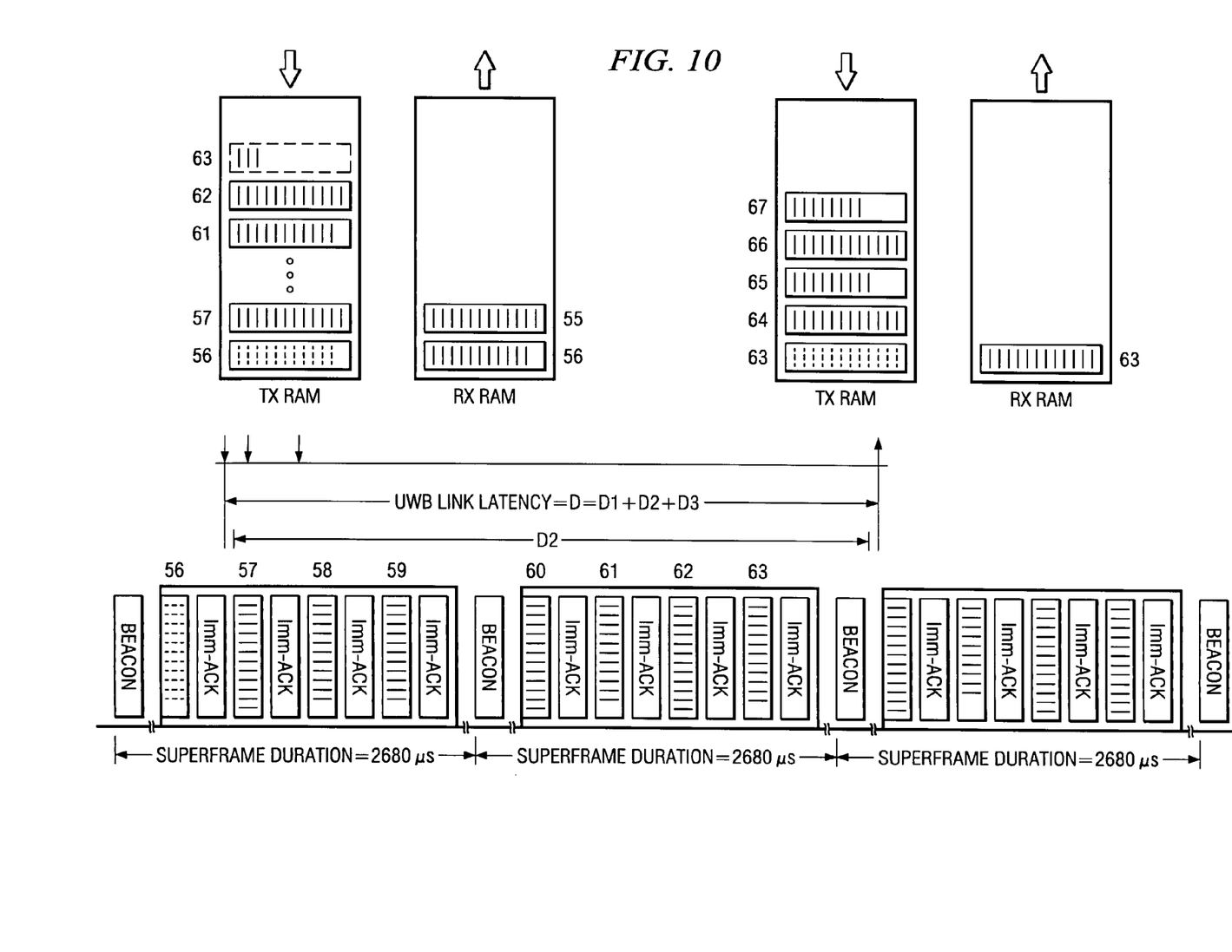
FIG. 10 shows a diagram highlighting an example on how the TX RAM size is determined for a UWB system with a range of 7.3 meter in accordance with an embodiment of the invention.

Referring now to FIG. 10, there is shown an illustrative example on how to determine the TX RAM size for a range of 7.3 meters for the UWB system. The TX RAM size should be ≧1 data frame+maximum number of data frames that may be transmitted during a time interval of D which as discussed before in this example is equal to 3,902 µs. In this illustrative example, this is equal to (1+7) data frames=8× 2,320 bytes=18,560 bytes, assuming 1 data frame=(16+12× 192) bytes=2,320 bytes. A second criteria to look at for the TX RAM size is that the TX RAM size should be ≧maximum number of data frames that may arrive in the TX RAM during a time interval of D which is equal to 3,902 µs, which is equal to 19,404×3,902/8 bytes (unframed)=[9,464/(192× 12)]×2,320 bytes=11,600 bytes. So taking the two criteria discussed, to be safe, the TX RAM should have a size of at least 11,600 bytes given the speed in which the MPEG2 application delivers frames into the TX RAM buffer.

Figure 11:
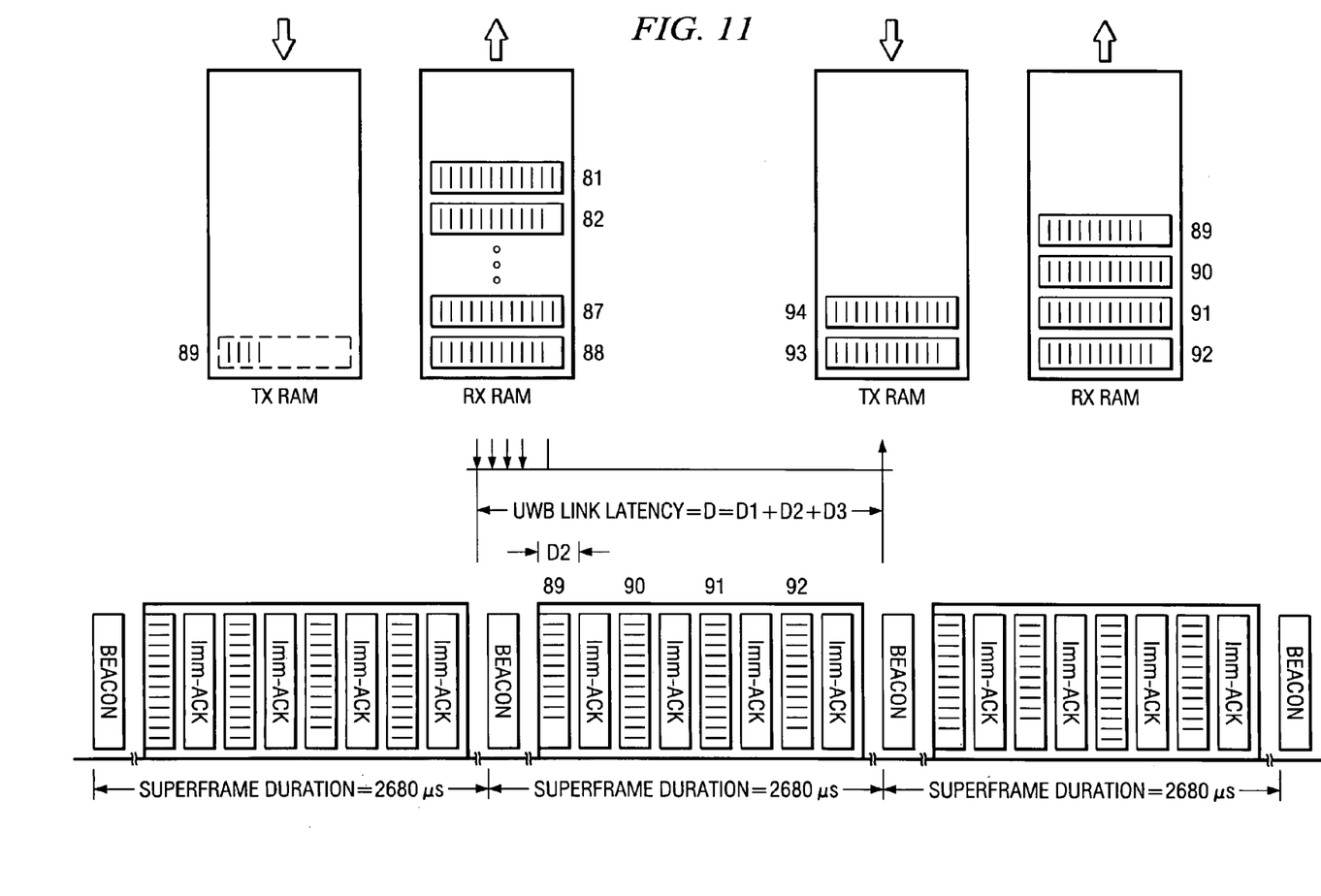
FIG. 11 shows a diagram highlighting an example on how the RX RAM size is determined for a UWB system with a range of 7.3 meter in accordance with an embodiment of the invention.

In FIG. 11, there is shown an illustrative example on how the RX RAM size is determined for a UWB range of 7.3 meters. In accordance with an embodiment of the invention, the RX RAM size should be ≧the maximum number of data frames that may be transmitted during a time interval of D=3,902 µs=4 data frames=4×2,320 bytes=9,280 bytes, assuming 1 data frame=(16+12×192) bytes=2,320 bytes. In the second consideration or application related consideration for the RX RAM size, the RX RAM size should be ≧the maximum number of data frames that may arrive in the TX RAM during a time interval of D=3,902 µs=19,404×3,902/8 bytes (unframed)=9,464 bytes (unframed)=[9,464/(192× 12)]×2,320 bytes=11,600 bytes. Thus, in order to avoid buffer overflows, the RX RAM should be at least 11, 600 bytes given the speed in which the MPEG2 application loads the TX RAM.

Figure 12:
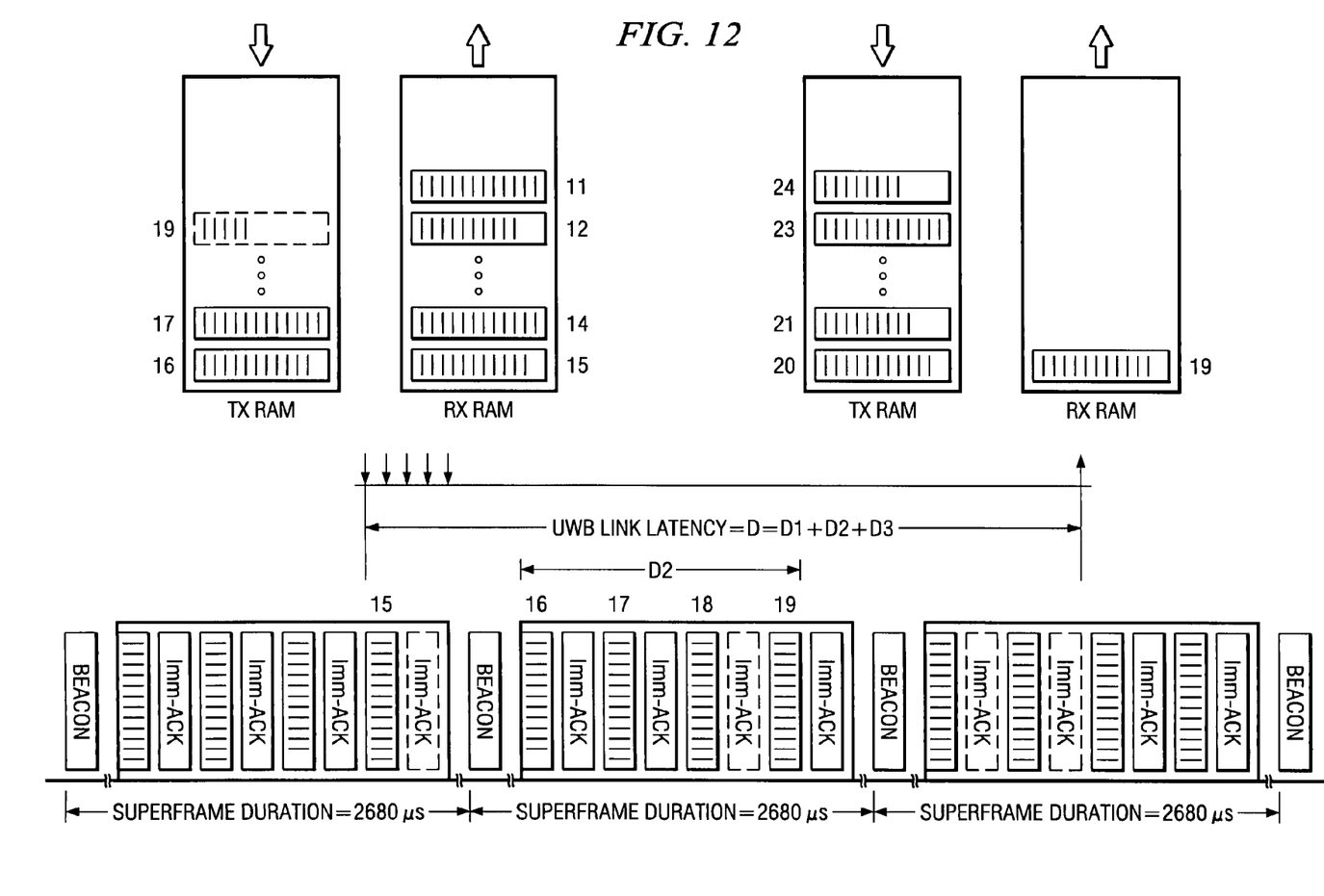
FIG. 12 shows a diagram highlighting an example on some transmission constraints for a UWB system with a range of 7.3 meter in accordance with an embodiment of the invention.

In FIG. 12, there is shown an illustrative example highlighting some of the transmission constraints for an UWB system with a range equal to 7.3 meters. In the illustrative example shown, a data frame must be transmitted within I=4 frame transmissions (frame numbers 16-19) since the arrival of its earliest MPEG2 cell in order to meet the UWB link latency of D=3,902 μs.

In summary, using the retry algorithm of the present invention in an UWB system that transfers MPEG2 streaming video, where 1 data frame=12 192-byte MPEG2 cells (188 bytes for standard MPEG2 cell and 4 bytes for UWB timestamp)+16-byte MAC/PHY header=2,320 bytes; the MPEG2 cell data rate=19.404 Mb/s=45,478,125 cells/hour=3,789,844 frames/hour; the PHY rate=110 Mb/s; and the Data frame delay lime=1,000 μs; the following results were had using the retry algorithm of the invention:

For a Wireless Range Between the Two Wireless Devices Equal to 7.3 Meters:
  Net throughput per CTA=26.9 Mb/s
  Retry limit=3, target frame loss rate=1 frame/hour
  UWB link latency=3,902 μs
  TX RAM size=8 data frames=18,560 bytes=18.1 KB
  RX RAM size=4 data frames=9,280 bytes=9.1 KB For a Wireless Range Between the Two Wireless Device Equal to 9.0 Meters:
  Net throughput per CTA=21.3 Mb/s
  Retry limit=9, target frame loss rate=1.33 frames/hour
  UWB link latency=8,268 μs
  TX RAM size=14 data frames=32,480 bytes=31.7 KB
  RX RAM size=12 data frames=27,840 bytes=27.2 KB Without retries, the frame loss rate is too large, while with too many retries, the link latency increases, the TX RAM overflows and the RX RAM under-runs. Different degrees of retries accommodate different ranges of frame error rates and achieve different ranges of frame loss rates. While different degrees of retries require different transmission link latencies and different TX and RX RAM sizes, the retry algorithm of the invention takes into account these different competing concerns and provides a straightforward solution on how many retries should be used given the different system conditions. The retry algorithm tries to achieve a constant delay for each packet in a frame like those used in an MPEG-2 application. The other advantage of the invention is that "old" packets can be dropped at the transmitter side, thereby clearing up the channel congestion caused by retries. The invention addresses the unique characteristics (e.g., high error rates and bursty transmissions) of wireless networks and the stringent timing and frame loss rate requirements and variable data rates encountered with Audio/Video applications such as MPEG-2.

While the preferred embodiments of the invention have been illustrated and described, it will be clear that the invention is not so limited. Numerous modifications, changes, variations, substitutions and equivalents will occur to those skilled in the art without departing from the spirit and scope of the present invention as defined by the appended claims.

What is claimed is:

1. A method for determining the transmission and retransmission attempts that will be made for a frame that needs to be transmitted, comprising:
  assembling the frame at a transmit buffer;
  storing the frame at the transmit buffer; and
  determining a value of N based on the equation $N=\min(N+B, I+1-Q)$ for a new transmission attempt and $N=N-1$ for a retransmission attempt to determine a maximum number of transmission and retransmission attempts that may be made to transmit or retransmit the frame, the equation recalculates a value of N, based on the previous value N, wherein:
  N, after the recalculation, specifies a maximum number of transmission and retransmission attempts that may be made for a frame in the head of a transmit queue; B specifies a number of transmit opportunities elapsed between the arrivals of two successive frames in the transmit queue; Q specifies a number of frames currently residing in the transmit queue; and I specifies a constant value equal to a maximum number of transmit opportunities for a frame.

2. A method as defined in claim 1, wherein the value for the parameter I is set prior to transmitting the first frame of the transmit queue and remains unchanged for transmitting the subsequent frames of the transmit queue.

3. A method as defined in claim 1, wherein the value for the parameter I is related to the available bandwidth allocated for transmitting the frames in the transmit queue.

4. A method as defined in claim 3, wherein the value for I is also dependent on a size of the transmit buffer.

5. A method as defined in 1, further comprising:
  setting both B and N equal to I when the transmit buffer is empty.

6. A method as defined in claim 5, wherein the recalculated value of N is determined prior to each transmission or retransmission.

7. A method as defined in claim 6, wherein the frame is transmitted or retransmitted if the recalculated value of N is greater than 0.

8. A method as defined in claim 6, wherein the frame is discarded if the recalculated value of N equals zero.

9. A communication device, including a transmit buffer for storing a frame that needs to be transmitted, the communication device comprising:
  a transmit buffer for storing a frame that needs to be transmitted; and
  means for recalculating a value of N based on the previous value of N using the equation $N=\min(N+B, I+1-Q)$ for a new transmission attempt and $N=N-1$ for a retransmission attempt to determine a number of transmission and retransmission attempts that may be made to transmit or retransmit the frame, wherein:
  N, after the recalculation, specifies a maximum number of transmission and retransmission attempts that may be made for a frame in the head of a transmit queue; B specifies a number of transmit opportunities elapsed between the arrivals of two successive frames in the transmit queue; Q specifies a number of frames currently residing in the transmit queue; and I specifies a constant value equal to a maximum number of transmit opportunities for a frame.

10. A communication device as defined in claim 9, wherein the communication device includes a transmit buffer or transmit queue coupled to packets generated from Moving Picture Experts Group 2 (MPEG-2) codec.

11. A communication device as defined in claim 9, wherein the means for recalculating the value of N based on the equation $N=\min(N+B, I+1-Q)$ for a new transmission attempt or $N=N-1$ for a retransmission attempt attempts to adapt the number of retries to incoming and outgoing data rate changes in order to provide a substantially fixed delay wireless link.

12. A communication device as defined in claim 11, wherein the value for I is equal to a maximum number of transmit opportunities for a frame.

13. A communication device as defined in claim 11, further comprising a receive buffer coupled to the frames that are received.

14. A communication device as defined in claim 11, is transmitted or retransmitted if the recalculated value of N is greater than 0.

15. A communication device as defined in claim 11, wherein the frame is discarded if the recalculated value of N is equal to zero.

16. A communication device as defined in claim 14, wherein the communication device comprises a set top box.

17. A communication device as defined in claim 14, wherein the recalculated value of N is maintained so that it is not larger than (I+1−−Q).

18. A method for maintaining a substantially constant delay for each packet in a frame that is transmitted between a first and a second communication device, comprising the steps of:
  (a) recalculating a maximum number of transmission and retransmission attempts that may be made for every frame that is to be transmitted or retransmitted from the first to the second communication device; and
  (b) using the equation to recalculate a value of N=min (N+B, I+1−Q) for a new transmission attempt and N=N−1 for a retransmission attempt in order to determine the maximum number in step (a), the equation recalculates a value of N, based on the previous value of N,
    wherein N, after the recalculation, specifies a number of transmission and retransmission attempts that may be made for a frame in the head of a transmission queue to be transmitted from the first to the second communication device, B specifies a number of transmit opportunities elapsed between the arrivals of two successive frames in the transmit queue; Q specifies a number of frames currently residing in the transmit queue; and I specifies a constant value equal to a maximum number of transmit opportunities for a frame.

19. A method as defined in claim 18, wherein the value for I comprises a fixed number that is stored within the first communication device.

20. A method as defined in claim 18, wherein steps (a) and (b) are performed prior to every transmission or retransmission between the first and second communication devices.

21. A method for recalculating a maximum number of transmission and retransmission attempts that may be made for a frame in the head of a transmit queue that needs to be transmitted from a first wireless communication device to a second wireless communication device using a communication link, the method comprising:
  (a) assembling and storing the frame at a transmit queue or transmit buffer located in the first wireless communication device;
  (b) determining a link delay for the communication link;
  (c) determining a maximum number of transmit opportunities that can be had for a frame to be transmitted by the first wireless communication device to the second communication device given the link delay between the two devices;
  (d) determining the number of frames currently located in the transmit buffer; and
  (e) using the previous number of transmission and retransmission attempts, the maximum number of transmit opportunities determined in (c) and the number of frames in the transmit buffer determined in (d) to recalculate the number of transmission and retransmission attempts that can be made for the frame.

22. A method as defined in claim 21, further comprising:
  determining the number of transmit opportunities elapsed between the arrivals of two successive frames in the transmit buffer.

* * * * *